Fig. 3

Sept. 22, 1970 J. W. LISTON ET AL 3,530,382
SYSTEM FOR SPEED INDICATION UTILIZING DIGITAL DISTANCE
AND DIGITAL TIME MEASURING APPARATUS
Filed Feb. 27, 1969 4 Sheets-Sheet 4

Inventors:-
John W. Liston,
Gordon E. Gee and
William K. Oliver
By Gory, Parker, Cuettner,
Pigott & Cullinan Att'ys.

United States Patent Office 3,530,382
Patented Sept. 22, 1970

3,530,382
SYSTEM FOR SPEED INDICATION UTILIZING DIGITAL DISTANCE AND DIGITAL TIME MEASURING APPARATUS
John W. Liston, Mount Prospect, Gordon E. Gee, Homewood, and William K. Oliver, Chicago Heights, Ill., assignors to Federal Sign and Signal Corporation, Blue Island, Ill., a corporation of Delaware
Filed Feb. 27, 1969, Ser. No. 802,875
Int. Cl. G01p 3/66
U.S. Cl. 324—178            21 Claims

ABSTRACT OF THE DISCLOSURE

An improved speed measuring and indicating apparatus which can be mounted in a first vehicle and operated therefrom to determine the speed of a second vehicle, the apparatus including first means coupled to the driving mechanism of the first vehicle for generating a number of electrical pulses proportional to the distance travelled by the first vehicle, second means for generating a number of electrical pulses proportional to the time required for the second vehicle to travel the same distance, and means for dividing the distance pulses by the time pulses to indicate the average speed of the vehicle over the foregoing distance, the apparatus also including readout means for indicating such speed and time and distance switches for manual actuation by an operator.

BRIEF SUMMARY OF THE INVENTION

The present invention relates to electrical apparatus for measuring the speed of a vehicle travelling on the highway. The apparatus is mounted in a first vehicle, for example, a police car, and it is operated from within the first vehicle in order to measure the speed of a second vehicle or target car which is observed by the driver of the first vehicle. The apparatus includes a time switch and a distance switch which are conveniently mounted for operation by the driver of the first vehicle.

One example of a method for operating the apparatus of the present invention is for the operator of the first vehicle to follow the target vehicle and turn on the time switch when the target vehicle passes a first selected location such as an underpass on the highway. When the first vehicle reaches the first selected location, the distance switch is turned on. The time switch is turned off when the target vehicle reaches a second selected location point on the highway, and the distance switch is turned off when the first vehicle reaches the second location point.

It will be understood that the above-mentioned distance pulses are transmitted to the computer means only while the distance switch is turned on, and thus the number of such pulses is proportional to the distance between the first and second selected location points. Similarly, the time pulses are transmitted to the computer means only while the time switch is turned on, and thus the number of such pulses is proportional to the time required for the target vehicle to travel between the first and second location points. Accordingly, the number of distance pulses divided by the number of time pulses will be proportional to the average speed of the target vehicle, and by introducing the proper scale factors into the apparatus, the actual speed can be displayed on a readout member in miles per hour.

There are many different variations of the method for using the apparatus of the present invention, and the foregoing description is simply one example thereof. The method of use is described and claimed in U.S. Pat. 3,182,331 to Arthur N. Marshall which is assigned to the assignee of the present invention. In the foregoing U.S. Pat. 3,182,331, the method of use is described in conjunction with certain mechanical apparatus, and such mechanical apparatus is also described and claimed in U.S. Pat 3,276,029.

The object of the present invention is to provide improved electrical apparatus for carrying out the method of speed indication described in the foregoing U.S. Pat. 3,182,331.

The foregoing and other objects and advantages of the invention will be apparent from the following description of a preferred embodiment thereof, taken in conjunction with the accompanying drawings.

Now, in order to acquaint those skilled in the art with the manner of making and using our invention, we shall describe, in conjunction with the accompanying drawings, a preferred embodiment of the invention.

DETAILED DESCRIPTION OF THE INVENTION

Figure 1:
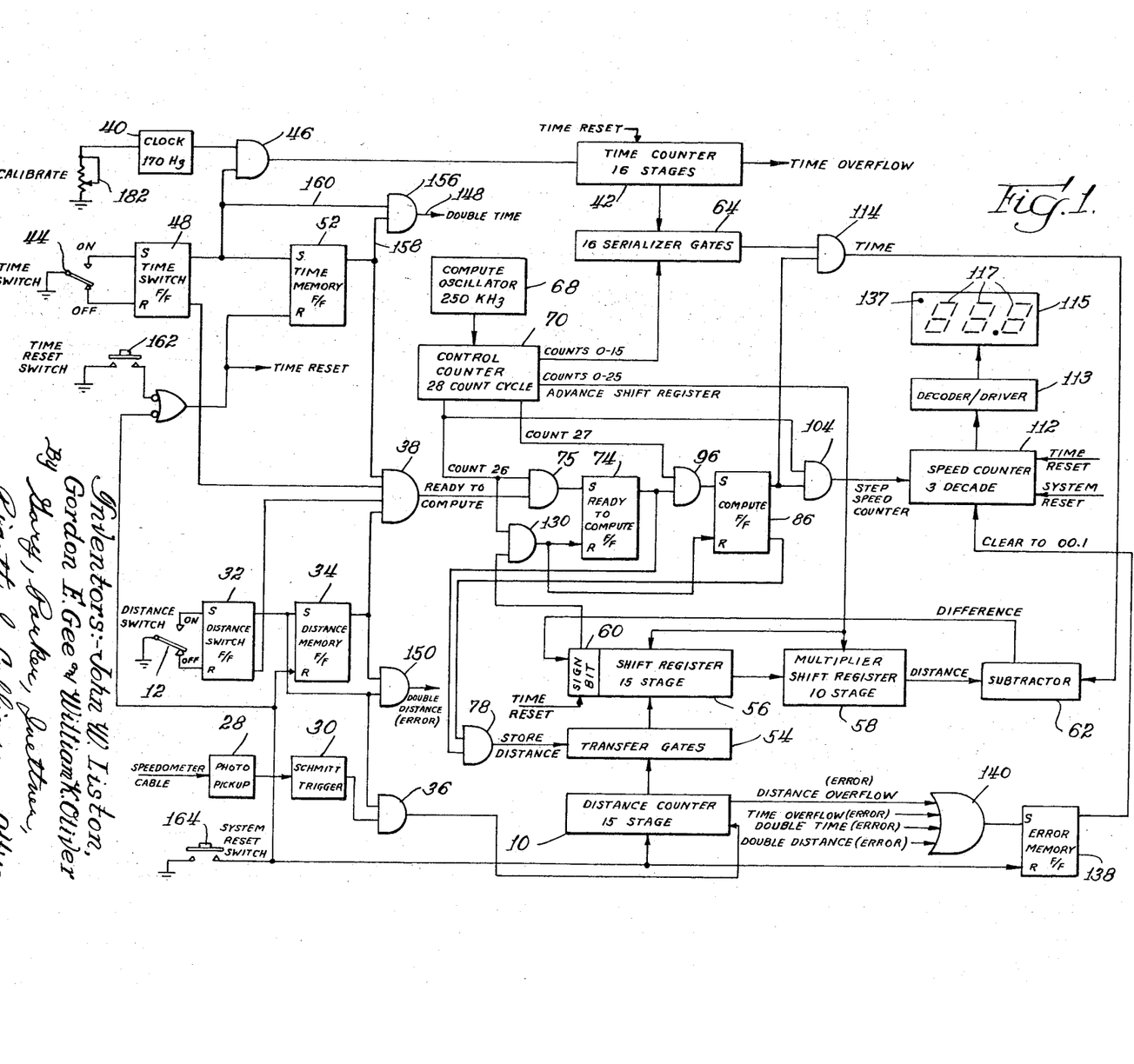
FIG. 1 is a schematic block diagram of speed indicating apparatus constructed in accordance with the present invention.
Figure 2:
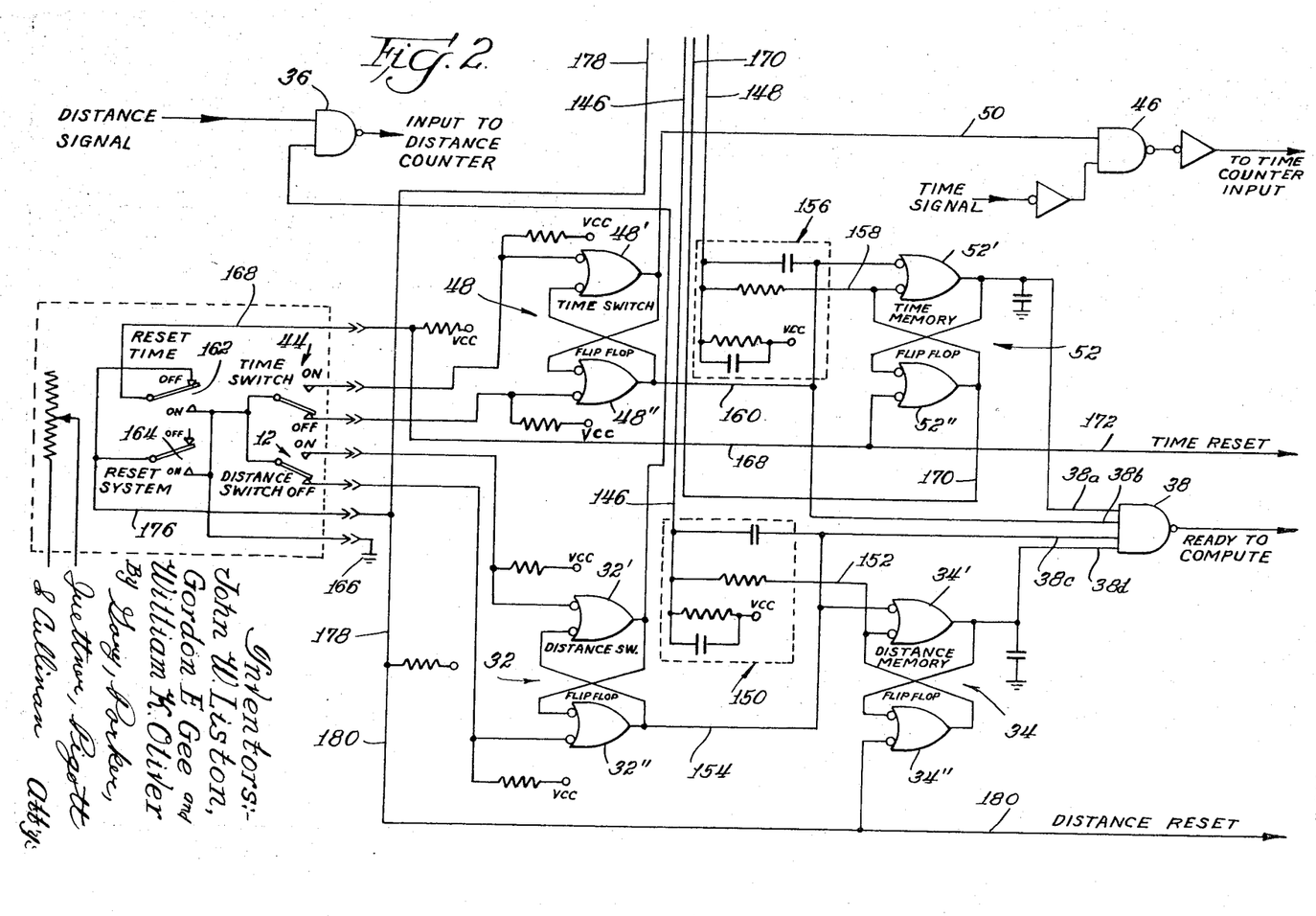
FIG. 2 is a wiring diagram showing the manner of operation of the manual time and distance switches and also showing the manner in which a speed computation is automatically initiated after time and distance information has been fed into the apparatus through operation of the foregoing switches.

Referring now to the drawings, there is shown in FIG. 1 a distance counter 10 which comprises a fifteen bit straight binary counter capable of storing approximately 5.46 miles of distance. A distance switch 12 is provided as shown in FIGS. 1 and 2, and when the switch 12 is manually turned on, a plurality of voltage pulses or signals will be transmitted to the distance counter 10 which counts the same, the number of distance pulses being proportional to the distance travelled by a vehicle equipped with the apparatus of the present invention during the time the distance switch is turned on.

Figure 4:
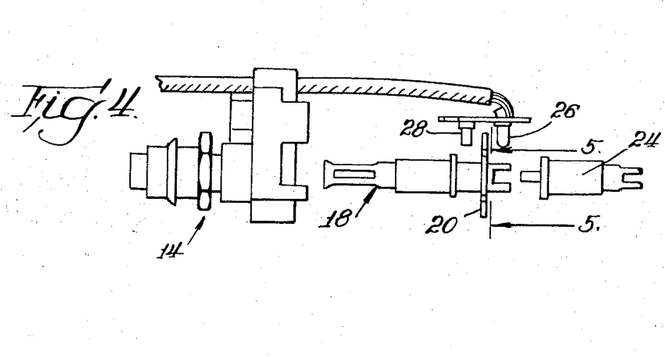
FIG. 4 is a fragmentary exploded elevational view showing a light source and a photo-sensitive device in combination with an interruptor wheel driven by the odometer cable of a vehicle in which the apparatus of the present invention is mounted, whereby the photosensitive device will be pulsed to produce a plurality of distance pulses proportional to the distance travelled by the vehicle.
Figure 5:
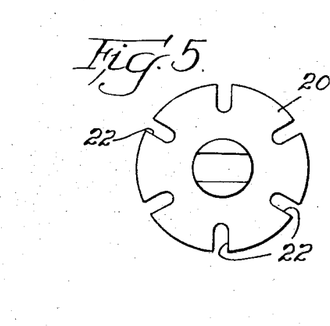
FIG. 5 is a view looking approximately in the direction of the arrows 5—5 of FIG. 4 showing the interruptor wheel which is driven in a rotary fashion by the odometer cable of FIG. 4.

FIGS. 4 and 5 show pulse generating apparatus for producing the distance pulses through a drive connection directly to the odometer cable of a vehicle in which the apparatus of the present invention is mounted. It will, of course, be understood that an odometer cable is a conventional component of an automobile normally comprising a non-rotatable outer housing and an inner rotatable element which rotates a predetermined number of times per unit of distance travelled by the automobile. In most conventional automobiles the inner element of the odometer cable will rotate approximately 1000 revolutions per mile, although this is not a precise figure, and it can be assumed that a variation of ±10% is possible. The manner of adjustment to compensate for any such variation will be discussed later herein, and for the moment it may be assumed that the odometer cable will be rotated precisely 1000 revolutions per mile travelled.

A stationary connector is shown at 14 in FIG. 4, and the non-rotatable outer housing portion of the odometer table (not shown) may be connected at the left-hand end of the connector 14 in such a manner that the inner rotatable cable element will extend through the connector and be operatively connected to an interruptor wheel assembly 18 which includes an interruptor wheel 20, whereby the interruptor wheel will be driven by the odometer cable and rotated 1000 revolutions per mile of vehicle travel. The interruptor wheel 20 has six circumferentially spaced slots 22 formed therein, and from the foregoing it will be understood that one revolution of the wheel 20 will indicate a distance of 5.28 feet. Thus, the spacing between adjacent slots 22 may be equated to a distance travelled of 0.88 feet.

A connector 24 is also shown in FIG. 4, but the latter merely represents means for driving the conventional automotive odometer from the interruptor wheel assembly 18, thereby indicating that the distance pulse generating apparatus of the present invention may be connected into a conventional odometer drive system without disrupting the usual operation of the latter. FIG. 4 further shows a stationary lamp 26 and a stationary photo-sensitive device 28 which are mounted on opposite sides of the interruptor wheel 20. The photosensitive device 28 produces a voltage pulse each time one of the slots 22 in the interruptor wheel 20 permits light from the lamp 26 to strike the photosensitive device. Consequently, as the vehicle moves so as to drive the interruptor wheel 20 through the odometer cable, the photo-sensitive device 28 will produce one voltage pulse for every 0.88 feet travelled by the vehicle, or 6000 pulses per mile.

As shown in FIG. 1, the voltage pulses produced by the photo-sensitive device 28 are transmitted to a signal conditioning member 30. The signal conditioning member 30 may for example comprise a Schmitt trigger circuit so as to eliminate false distance pulses if the vehicle should stop while the photo-sensitive device circuit is in a transitional state. FIG. 1 further shows that the distance pulses produced by the photo-sensitive device 28 after passing through the signal conditioning member 30 are transmitted to the distance counter 10. However, it must be borne in mind that while such distance pulses will be produced whenever the vehicle is moving, the pulses will be transmitted to the distance counter 10 only when the distance switch 12 is turned on.

Referring to FIG. 2, it will be seen that when the distance switch 12 is turned on, a distance switch flip-flop 32 comprising a pair of gates 32′ and 32″ is set, and at the same time a distance memory flip-flop 34 comprising a pair of gates 34′ and 34″ is set. As indicated in FIGS. 1 and 2, the distance pulses from the signal conditioning member 30 (see FIG. 1) are transmitted to a gate 36, and the gate 36 is connected with the distance switch flip-flop 32, whereby the gate 36 will be enabled and produce an output signal when the distance switch flip-flop 32 is set. Accordingly, distance pulses will be transmitted from the gate 36 of FIG. 2 to the distance counter 10 shown in FIG. 1 only when the distance switch 12 is turned on. It will be understood that the gate 36 is represented in the drawings by a symbol having a flat input side to indicate an "and" gate, and such a symbol is intended to have the same meaning elsewhere herein.

It will also be noted that there is shown in FIG. 2 a four input coincidence or AND gate 38 which serves the purpose of providing an output, referred to herein as a "ready-to-compute" signal, since such an output signal initiates a speed computation, as will be described more fully hereinafter. The four inputs into the gate 38 are indicated at 38a, 38b, 38c, and 38d, and being an "and" gate the gate 38 will produce an output or "ready-to-compute" signal only when an input signal is present on each of the four inputs. It will be seen that when the distance switch 12 is turned on thereby setting the distance memory flip-flop 34, the latter will produce an enable or input signal on the lead 38d to the gate 38, thus satisfying one of four conditions necessary to produce an output signal from the gate 38.

As described above, whenever the vehicle equipped with the foregoing apparatus is moving, and the distance switch 12 is turned on, then 6000 pulses per mile or one pulse per 0.88 feet will be transmitted from the gate 36 of FIG. 2 (see also FIG. 1) to the distance counter 10 of FIG. 1. The distance counter 10 comprises a fifteen bit straight binary counter and thus has a capacity of $(2^{15})$ $-1$ or 32,767 pulses, which represents a capacity of 5.46 miles of vehicle travel. Consequently, in using the apparatus described in the preferred embodiment herein for checking the speed of a second vehicle, the distance switch 12 should not be turned on for a distance in excess of 5.46 miles, but of course in normal police use the foregoing capacity of the distance counter is more than adequate. As a safety feature, however, it may be desirable to provide means as discussed hereinbelow for indicating on the speed readout if in fact the capacity of the distance counter 10 is exceeded.

Any suitable means may be provided whereby an overflow pulse from the distance counter 10 produces an indication on the readout which informs the operator that the capacity of the equipment has been exceeded. For example, the present apparatus includes a speed counter comprising a binary coded decimal counter, as will be described further hereinafter, and an overflow pulse from the distance counter 10 may be used to set an error memory flip-flop which clamps the least significant unit on the least significant stage of the speed counter, e.g., 00.1 m.p.h., thus causing the speed readout to display a speed of 0.1 m.p.h. Such a predetermined signal would indicate to the operator that an error has been made in the operation of the device.

Having explained the apparatus for producing and counting the distance pulses, we will now describe the apparatus for producing and counting the time pulses. FIG. 1 shows a clock or oscillator 40 which may be referred to as an internal 170.7 Hz. oscillator in that it is designed to produce 170.7 pulses per second. It is, however, important that the oscillator 40 be of a type which provides for frequency adjustment, since it is a feature of the present invention that the speed indicating apparatus is calibrated by adjusting the frequency of the oscillator. The oscillator or clock 40 is preferably adjustable so that it will produce 170.7 pulses per second ± 10%. Of course the selected frequency is to some extent a matter of choice, as will be discussed more fully later herein. It will however be understood that the purpose of the oscillator 40 is to produce a constant predetermined number of pulses per unit of time, and that various known types of devices may be used for this purpose.

FIG. 1 shows the time signal or time pulses being supplied to a time counter 42. However, FIG. 1 further shows a time switch 44, and it is important to note that the time pulses are supplied to the time counter 42 only when the time switch 44 is turned on, it being understood that both the distance switch 12 and the time switch 44 are conveniently mounted for manual operation by the driver of a vehicle in which the speed indicating apparatus of the present invention is mounted.

Referring to FIGS. 1 and 2, it will be seen that the time pulses are supplied to a gate 46, and when the latter produces an output then the time pulses are transmitted from the gate 46 to the time counter 42. It will further be seen that when the time switch 44 is turned on, a time switch flip-flop 48 comprising a pair of gates 48′ and 48″ is set, and the time switch flip-flop is connected with the gate 46 over the lead 50, whereby when the flip-flop 48 is set it will enable the gate 46 causing the latter to transmit the time pulses to the time counter 42 at the approximate rate of 170.7 pulses per second, the precise frequency depending upon the adjustment of the clock 40. In addition, the turning on of the time switch 44 will set a time memory flip-flop 52 comprising a pair of gates 52' and 52", and the latter is connected over the lead 38a to the gate 38. Accordingly, the turning on of the time switch 44 controls a second one of the four elements of the gate 38 and thus satisfies a second one of four conditions necessary to produce an output or "ready-to-compute" signal from the gate 38.

The time counter as shown at 42 in FIG. 1 receives the time pulses from the gate 46 and counts the same. The time counter 42 comprises a sixteen bit straight binary counter having a capacity of $(2^{16})-1$ or 65,535 pulses, and if it be assumed that the clock 40 produces 170.7 pulses per second, then the capacity of the time counter 42 is approximately 6.40 minutes. As in the case of the distance counter 10, it is desirable to provide a safety feature whereby if the time switch is turned on for a period in excess of 6.40 minutes, then a time overflow pulse will be transmitted to an error memory flip-flop or the like which clamps a reading such as 00.1 on the speed counter, whereby when the speed readout displays a speed of 00.1 the operator will know that the device has been operated improperly. However, here again a capacity of 6.40 minutes will normally be more than adequate for the time counter 42.

As explained earlier herein, and as more fully described in the aforementioned U.S. Pat. 3,182,331, in using the apparatus of the present invention the apparatus is mounted in a vehicle and the driver of that vehicle operates the distance and time switches 12 and 44 at appropriate times in order to determine the speed of a second vehicle. In the particular example described earlier herein, where the first vehicle is following the target vehicle, it was noted that the time switch 44 is turned on when the target vehicle is observed switch 12 is turned on when the first vehicle passes the first selected location point; the time switch 44 is turned off when the target vehicle is observed passing a second selected location point; and the distance switch 12 is turned off when the first vehicle pases the second selected location point.

Many variations of the foregoing method are possible, and the order in which the switches are operated will vary. However, in making any such speed determination, whatever the sequence may be, the time switch 44 will be turned on and subsequently turned off to feed a certain number of time pulses to the time counter 42, and the distance switch 12 will be turned on and subsequently turned off to feed a certain number of distance pulses to the distance counter 10. At that point, the speed computation is made by in effect dividing the distance pulses by the time pulses. Therefore, referring to FIG. 2, it will be noted that when the distance switch 12 is turned off the distance switch flip-flop 32 is reset and a signal is produced over the lead 38c to set a third one of the elements of the gate 38, and when the time switch 44 is turned off the time switch flip-flop 48 is reset and a signal is produced over the lead 38b to control a fourth one of the elements of the gate 38. After controlling all four of the elements of the gate 38, the latter will produce an output referred to herein as a "ready-to-compute" signal, which as described more fully hereinbelow automatically initiates a speed computation so that a speed is computed and displayed almost instantaneously on a speed readout member.

It should be understood in connection with the operation of the foregoing apparatus that in accordance with certain methods of speed determination it may be necessary to make repeated use of the distance information which is contained in the distance counter 10. For example, in accordance with one method of speed determination, a police car equipped with the apparatus of the present invention can drive along the road between two selected location points and the driver can turn on the distance switch 12 when he passes the first location point and turn off the distance switch when he passes the second location point, thereby feeding into the distance counter 10 a certain number of pulses representative of the distance between the two selected location points. Thereafter, the police car can park and wait at a suitable vantage point so as to observe other cars moving between the same two location points.

Since the proper distance is fed into the apparatus in advance, the police officer can measure the speed of a passing car by simply turning on the time switch 44 when a target car is observed passing the first location point and turning off the time switch when the target car passes the second location point, whereby when the time switch is turned off the speed of the target car will be computed and displayed automatically. It will be understood that the foregoing method can be repeated many times always using the same distance information. It is for this reason that, in accordance with a preferred embodiment of the present invention, the pulse count in the distance counter 10 is not destroyed when a speed computation is made. Moreover, reset mechanism is provided whereby the operator may selectively reset the time counter 42 without resetting the distance counter 10. Apparatus for accomplishing the foregoing objectives will be described hereinbelow.

With reference to FIG. 1, it will be seen that the distance counter 10 is associated with corresponding distance transfer gates 54 which lead to a distance shift register 56, the latter being associated with a multiplier 58. It is not believed necessary to describe these components in detail since they are per se conventional components and are understood by those skilled in the art. As previously indicated, the distance counter 10 comprises a fifteen bit straight binary counter. When the distance transfer gates 54 are operated, the distance information is transferred to the distance shift register 56. In other words, fifteen distance transfer gates 54 are provided, one corresponding with each of the stages of the fifteen stage distance counter 10, and when a "store distance" pulse is transmitted to the several transfer gates, the distance information is transferred to the distance shift register 56, the transfer being on a non-destruct basis so that the information in the distance counter remains therein even after the "store distance" pulse effects the aforementioned transfer.

The multiplier 58 comprises a ten bit binary multiplier which is added to the least significant side of the distance shift register 56, and for reasons to be explained later herein, a sign bit or sign flip-flop 60 is added to the most significant side of the shift register. The ten bit binary multiplier 58 by adding ten stages to the shift register 56 will multiply the number of pulses from the distance counter by $2^{10}$ or 1024. The magnitude of the latter multiplier is to some extent a matter of choice, as is the frequency of the clock 40, the object being to provide a clock which produces a practical or convenient number of pulses per second so as to contribute toward an accurate speed indicating device, and also of course to provide a practical and accurate distance pulse generator such as the device described earlier herein in conjunction with FIGS. 4 and 5 which produces approximately 6000 pulses per mile.

It will of course be understood that the clock 40, the multiplier 58 and the distance pulse generator 20, 28 must be coordinated so that the speed readout will display a reading of miles per hour. Thus, let us assume that a target vehicle is travelling at 60 miles per hour, or 1 mile per minute. In accordance with the system described hereinabove, one mile equals 6000 distance pulses, which are multiplied by 1024, and one minute equals 60 times 170.7 time pulses, ince the clock 40 produces 170.7 time pulses per second. Thus:

$$\text{Speed} = \frac{\text{Distance}}{\text{Time}}$$

$$\text{Speed} = \frac{6000 \times 1024}{60 \times 170.7} = 600$$

The speed readout to be described hereinafter provides a speed reading in tenths of a mile per hour, and therefore the above reading will be displayed as 60.0 m.p.h. It will thus be seen that the various components of the apparatus described herein are coordinated so that when the number of distance pulses multiplied by 1024 is divided by the number of time pulses, the quotient will represent speed in tenths of a mile per hour.

The distance shift register 56 contains fifteen bits corresponding to the fifteen bits of the distance counter 10, along with the ten bits of the multiplier 58, and it shifts the distance information on a bit-by-bit basis to a full subtractor 62, while the time information is fed in bit-by-bit fashion from the time counter 42 to the full subtractor. These operations will be described more fully later herein, but it will be understood that the division of distance pulses by time pulses is accomplished by repeatedly subtracting the time value from the distance value and counting the number of successful subtractions which can be carried out until the distance value is exhausted and goes to a negative number. That is, if the number of successful subtractions of time from distance is counted, and if the computation is stopped when the distance value changes sign and becomes negative, then the number of successful subtractions will in fact equal distance divided by time or speed. The foregoing ex-explains the reason for the sign bit 60 which is added to the most significant side of the distance shift register 56, since when time is repeatedly subtracted from distance in the full subtractor 62, it will become necessary to borrow from the sign bit 60 when the distance information goes to zero, and it is at this point that the computation is stopped.

Figure 3:
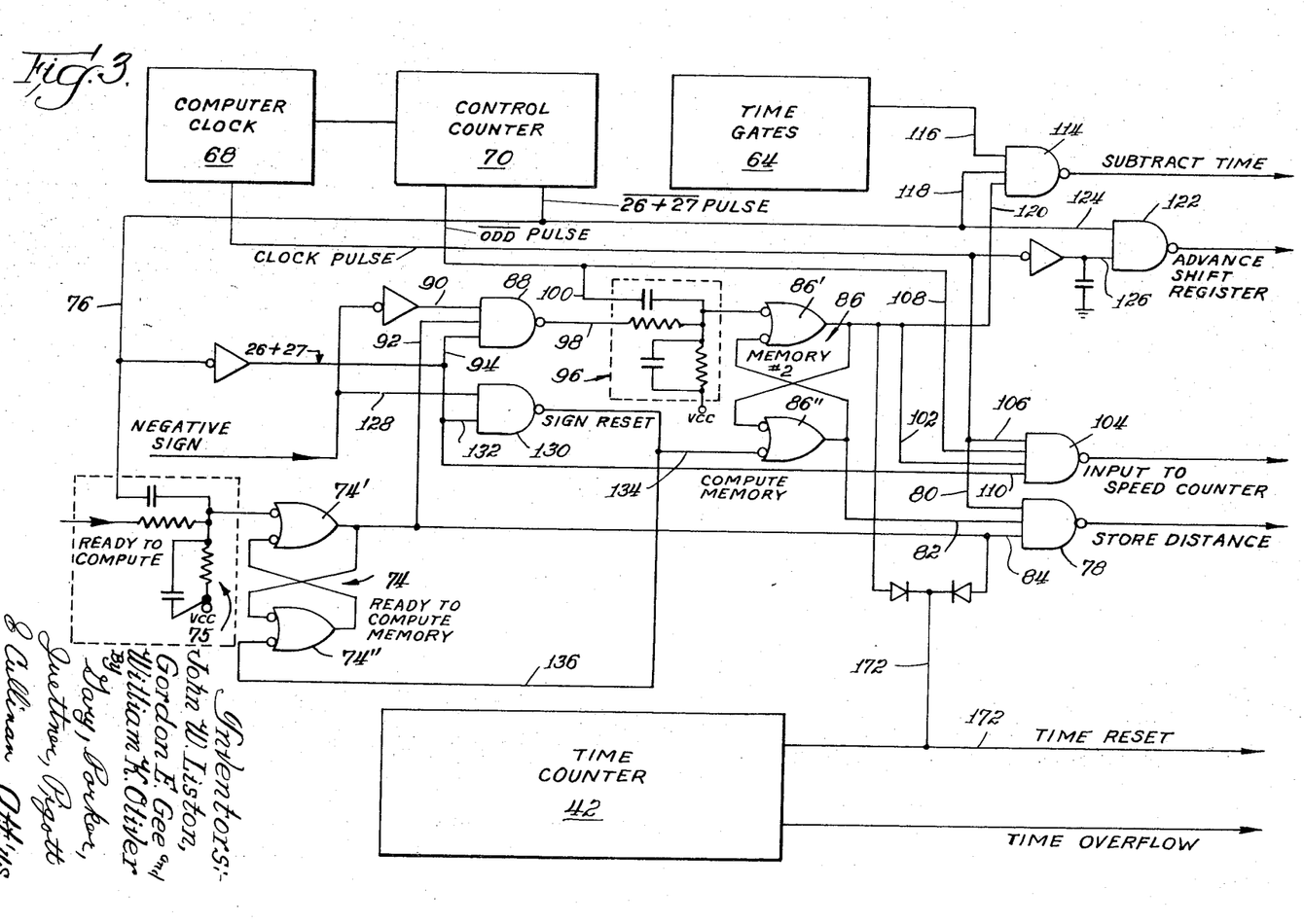
FIG. 3 is a wiring diagram, certain components being illustrated only in block form, showing a time pulse counter and related apparatus, a computer clock together with a control counter, and circuitry whereby a "ready to compute" signal initiates various operations incident to a speed computation.

As shown in FIGS. 1 and 3, the timer counter 42 is associated with a plurality of time gates 64, there being provided sixteen time serializer gates 64 or one corresponding to each of the sixteen bits of the straight binary time counter. When the time gates 64 are actuated, the time information is fed in serial fashion with the least significant bit occurring first, the time information being logically gated to the full subtractor 62.

FIGS. 1 and 3 further show a computer clock 68 comprising an internal approximately 250 kHz. oscillator which is associated with a control counter 70. The control counter 70 comprises a 28 count binary counter which repeatedly goes through a 28 count computation cycle as it is pulsed by the computer clock 68. It will thus be understood that one computation cycle requires twenty-eight pulses from the clock 68, and the latter produces pulses at the rate of 250,000 per second. With reference to the distance shift register 56 and multiplier 58, these components together have a total of twenty-six bits including the added sign bit 60, and thus it requires twenty-size pulses, i.e., count 0–25, to feed all of the foregoing information through the full subtractor 62, leaving two extra pulses, i.e., counts 26 and 27, for other operations to be discussed later herein.

We have described hereinabove the manner in which an output signal or "ready-to-compute" signal is produced from the gate 38 of FIG. 2 after the distance and time switches 12 and 44 have both been turned on and subsequently turned off. Reference is now made to FIG. 3 which shows the "ready-to-compute" signal being fed to control logic circuitry which is shown together with the computer clock 68 and the binary control counter or cycle counter 70, the latter two components being shown in block form. When the "ready-to-compute" signal is received it must be synchronized with the control counter 70, which as mentioned previously provides repeated cycles of twenty-eight counts, the counts being referred to herein as counts 0 through 27.

In the embodiment being described, the control counter 70 is designed so that after the "ready-to-compute" signal is received, which can occur at any time during counts 0 through 27, a ready-to-compute flip-flop 74 comprising gates 74' and 74" is set at count 26. In other words, the ready-to-compute signal may come in at any time during counts 0 through 27, but the ready-to-compute flip flop 74 will always be set at the following count 26 in order to synchronize the ready-to-compute signal with the control counter 70. As shown in FIG. 3, the computer clock 68 pulses the control counter 70, and the ready-to-compute signal enables a gate 75 thereby permitting the counts $\overline{26+27}$ pulse to be conducted from a line 76 through gate 75 to the ready-to-compute flip flop 74 thereby setting the latter at count 26.

FIG. 3 further shows a three-element gate 78 having three input leads 80, 82 and 84. The lead 80 carries the clock pulse produced by the computer clock 68. The lead 82 is connected to a compute flip flop 86 which includes a pair of gates 86' and 86", and the lead 82 will enable a corresponding element of the gate 78 whenever the compute flip flop 86 is reset, the latter flip flop normally being reset when the ready-to-compute signal is received. Finally, the third lead 84 will enable the third element of the gate 78 when the ready-to-compute flip flop 74 is set. Accordingly, when the ready-to-compute flip flop 74 is set at count 26 as above described, the gate 78 will be enabled so as to produce an output which may be referred to as a "store distance" pulse. The "store distance" pulse from the gate 78 is conducted to the several distance transfer gates 54 of FIG. 1 thereby causing the distance information to be transferred to the distance shift register 56.

On the next clock pulse after storing of the distance information in the shift register 56, the compute flip flop 86 is set. A three-element gate 88 is connected with input leads 90, 92 and 94. The lead 90 is connected with the added sign bit of flip flop 60, and the corresponding element of the gate 88 will be enabled whenever there is a plus sign, i.e., a positive number in the distance shift register 56. The second lead 92 is connected with the ready-to-compute flip flop 74 and thus the second element of the gate 88 will be enabled when the ready-to-compute flip flop 74 is set. The third lead 94 carries the counts $\overline{26+27}$ pulse from the control counter 70. Accordingly, the gate 88 will be enabled and will produce an output during the counts $\overline{26+27}$ pulse from the control counter 70. A gate 96 receives the counts $\overline{26+27}$ pulse from the gate 88 over the lead 98, and also receives all $\overline{\text{odd}}$ pulses from the control counter 70 over the lead 100. Thus, the gate 96 will be enabled at count 27 and will produce an output which sets the compute flip flop 86. In the foregoing manner, the compute flip flop 86 is set at count 27.

When the compute flip flop 86 is set, at count 27 pulse from the cycle counter 70, it will no longer enable the gate 78 over the lead 82. Consequently, the gate 78 produces a single clock pulse or "store distance" signal at count 26, and at the next count 27 the gate 78 is inhibited and ceases to produce an output due to the setting of the compute flip flop 86. The setting of the compute flip flop 86 also acts over a lead 102 to enable one element of a four element gate 104, the latter also having input leads 106, 108 and 110. A second element of the gate 104 is enabled over the lead 106 by the clock pulse from the clock 68, which pulses are of course produced continuously at the rate of approximately 250,000 per second. A third element of the gate 104 is enabled over the lead 108 by the $\overline{\text{odd}}$ pulse from the cycle counter 70, and a fourth element of the gate is enabled over the lead 110 by the count $\overline{26+27}$ pulse.

It will be noted, however, considering the foregoing four conditions together, that once the compute flip flop 86 is set at count 27, the gate 104 will not be enabled and produce an output until the even-numbered count 26 pulse in the following cycle. However, when the count 26 pulse is produced in the following cycle by the cycle counter 70, th gate 104 will produce an output pulse which is conducted to the speed counter 112 of FIG. 1, providing that the compute flip flop 86 remains set. As will be explained more fully hereinafter, it is in this manner that a single pulse is conducted from the gate 104 to the speed counter 112 each time the time pulses are successfully subtracted from the distance pulses, whereby the number of pulses conducted to the speed counter corresponds with the speed of the target vehicle.

A gate 114 shown in FIGS. 1 and 3 is also enabled when the compute flip flop 86 is set. The three element gate 114 has input leads 116, 118 and 120. The lead 116 carries the time bits or time pulses in serial fashion from the time counter 42. The lead 118 carries pulse counts 0 through 15 from the cycle counter 70, and the lead 120 enables the third element of the gate 114 when the compute flip flop 86 is set. Consequently, the gate 114 produces an output during the 0 through 15 counts of the cycle after the setting of the compute flip flop at count 27. It will be noted that as mentioned previously there are sixteen time serializer gates 64, and the count 0 pulse from the control counter 70 will actuate the first gate corresponding to the least significant time bit, the count 1 pulse will actuate the next gate, and so on. It will thus be understood that the output of the gate 114 will comprise the sixteen time bits, arranged in serial fashion with the least significant bit first, which are transmitted from the gate 114 to the full subtractor 62.

A gate 122 shown in FIG. 3 transmits pulses for advancing the shift register 56 of FIG. 1 so that the distance information will be fed to the subtractor 62 and the time pulses subtracted therefrom. The gate 122 is provided with two input leads 124 and 126. The lead 124 carries count 0 through count 25 pulses from the control counter 70, while lead 126 carries the clock pulses from the computer clock 68. Consequently, it will be understood that the shift register 56 is in fact always shifting twenty-six bits of distance information through the subtractor during every twenty-eight count cycle. Thus, the shift register 56 shifts regardless of the "ready-to-compute" signal, but of course only zeros are subtracted from the distance information until such time that the time bits are fed to the full subtractor 62, after which the time pulses are subtracted from the distance pulses. The distance remainder is fed back to the distance shift register 56 and of course is reduced each cycle by the amount of the time. Moreover, each time a successful subtraction is made, the gate 104 transmits an output pulse to the speed counter 112 which will be described more fully later herein.

The subtraction process continues until the distance information becomes negative and it thus becomes necessary to borrow from the added sign bit 60, at which time the latter will produce a negative sign pulse. Specifically, when the number in the distance shift register 56 changes sign, the sign bit or sign flip-flop 60 (see FIG. 1) will produce a negative sign pulse at the following count 26 of the control counter 70. Referring to FIG. 3, it will be seen that the negative sign pulse inhibits gate 88 since a positive sign is necessary on the lead 90 in order to enable the latter gate. At the same time, the negative sign pulse is carried over a lead 128 to a gate 130 so as to enable one element of the latter, and the second element of the gate 130 is enabled over a lead 132 by the $\overline{26+27}$ pulse from the control counter counter 70. Consequently, gate 130 will produce an output at count 26 which is conducted over lead 134 to reset the compute flip flop 86, and which is conducted over lead 136 to reset the ready-to-compute flip flop 74.

Once the compute flip flop 86 has been reset, the gate 114 will be inhibited and the time bits will no longer be fed to the subtractor 62. While the distance shift register 56 will continue to shift, it will be understood that only zeros will be subtracted from the distance information. When the compute flip flop 86 is reset, the gate 104 is also inhibited, and thus no further pulses will be transmitted to the speed counter 112. Moreover, the above-described resetting of the ready-to-compute flip flop 74 inhibits the gate 78, and thus no further "store distance" pulses will be transmitted to the distance transfer gates 54. Accordingly, at this point the speed computation is stopped.

FIG. 1 shows the speed counter 112 which as described above receives one pulse each time a successful subtraction is made. The speed counter 112 comprises a three decade counter which counts in a binary coded decimal manner. It is not believed necessary to describe the speed counter 112 in detail, but it will be understood that it includes three stages, one stage for tens, one stage for units or ones, and one stage for tenths. For example, when the tenths stage reaches its capacity it overflows into the units stage, and upon reaching its capacity the units stage overflows into the tens stage. Each of the three stages includes four elements which provide ten combinations.

As shown in FIG. 1, the speed counter 112 is connected with a lamp segment decoder driver 113 which in turn is connected with a lamp segment display or speed readout 115. The lamp segments 117 are arranged in three stages and each stage comprises seven individual lamp segments 117 arranged in the form of two parallelograms one immediately above the other, whereby any given number from 00.1 to 99.9 may be displayed by lighting certain ones of the segments. Moreover, the capacity of the speed readout 115 is extended to 199.9 miles per hour by provision of an additional marker 137 which is lighted to indicate that 100 miles per hour is to be added to the displayed speed reading. Thus, when the speed counter reaches 99.9 miles per hour, the next incoming pulse will reset the three stages of the speed counter and produce an overflow pulse which serves to light the 100 miles per hour marker 137, after which the speed counter will continue to function up to a speed of 199.9 miles per hour.

It will be noted that each stage of the speed counter 112 comprises four bits, and each of the corresponding three stages of the lamp segment display 117 comprises seven bits. Accordingly, the lamp segment decoder/driver 113 is used to convert four bits of information into seven bits in order to coordinate the speed counter 112 with the speed readout 115. It will thus be understood from the foregoing that once the computation has been stopped in the manner described above, the operator may simply read the speed reading as displayed on the lighted speed readout 115.

Figure 6:
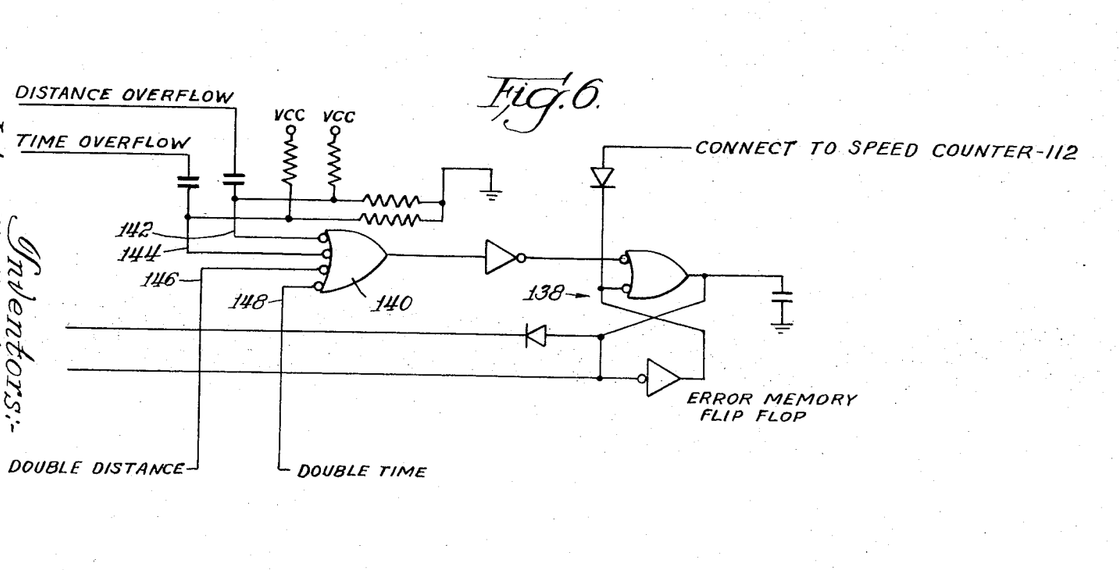
FIG. 6 is a wiring diagram showing an error memory unit which cooperates with a speed readout system to indicate when an error is made in operating the apparatus of the present invention.

FIG. 6 is a wiring diagram showing an error memory unit 138 together with an "or" gate 140 having four input leads 142, 144, 146 and 148. The lead 142 conducts a "distance overflow" pulse to the gate 140; the lead 144 conducts a "time overflow" pulse to the gate 140; the lead 146 conducts a "double distance" pulse to the gate 140; and the lead 148 conducts a "double time" pulse to the gate 140. It will be understood that the "or" gate 140 will produce an output and will set the error memory flip-flop 138 whenever any one of the four different pulses described above is transmitted to an input of the gate. Moreover, it will further be understood that the error memory flip-flop 138 is connected to the speed counter 112 (see FIG. 1) so that whenever the error memory is set it will clamp the least significant unit on the least significant stage of the speed counter 112, whereby the speed readout will display a fixed reading of 00.1 mile per hour. Accordingly, the latter reading will indicate to the operator that the apparatus has been operated improperly.

As mentioned previously, a distance overflow pulse is produced from the distance counter 10 whenever the distance switch 12 is turned on for a distance in excess of the capacity of the distance counter. In other words, when the distance counter 10 has reached its capacity, the next pulse received will reset all of the elements of the distance counter and produce an overflow pulse which is transmitted over lead 142 to the "or" gate 140. In a similar manner, when the time counter 42 has reached its capacity, the next pulse received will reset all of the elements of the time counter and produce an overflow pulse which is transmitted over lead 144 to the "or" gate 140.

The above reference to a "double distance" pulse means that a pulse is produced when the operator erroneously turns on the distance switch 12 to put distance into the distance counter 10 when the latter has not been cleared of distance information previously conducted thereto. Referring to FIG. 2, there is shown a gate 150 comprising several resistances and capacitors. The gate 150 will be enabled and produce an output pulse or "double distance" pulse over the line 146 whenever it receives enables over the two input lines 152 and 154, but only if the input over the line 152 is received first. Thus, when the distance switch 12 has been turned on once so as to cause the distance memory flip-flop 34 to be set, the gate 150 will receive one enable over the line 152. If thereafter, while the distance memory flip-flop 34 remains set, the distance switch 12 is turned on a second time, thereby again setting the distance switch flip-flop 32, then a second enable will be received over the line 154, and the gate 150 will produce an output or "double distance" pulse on the line 146.

In a manner similar to the foregoing, an "and" gate 156 as shown in FIG. 2 will be enabled and produce an outputp ulse or "double time" pulse over the line 148 whenever it receives enables over the two input lines 158 and 160, but only if the input over the line 158 is reecived first. Thus, when the time switch 44 has been turned on once so as to cause the time memory flip flop 52 to bet set, the "and" gate 156 will receive the first enable over the line 158. If thereafter, the time switch 44 is turned on a second time so as to feed more time to the time counter 42 when the latter has not been cleared of time information previously fed thereto, in which case the time memory flip flop will remain set, the time switch flip-flop 32 will be set whereby a second enable will be received over the line 160. Consequently, the "and" gate 156 will produce an output or "double time" pulse over the line 148 which in turn will set the error memory flip flop 138 of FIG. 6 as described hereinabove.

After the completion of a speed determination, it is necessary to reset the apparatus before proceeding with a further speed measurement. The operator may reset the entire apparatus, or if desired he may for reasons explained earlier herein reset only certain components thereof while leaving the previous distance information in the distance counter 10. FIG. 2 shows a time reset switch 162 and a system reset switch 164. Actuation of the time reset switch 162 will permit the operator to make a new speed determination using the previously stored distance information, while operation of the system reset switch 164 will reset the entire apparatus. Both switches 162 and 164 are mounted in a convenient location for manual operation by the drive of a vehicle equipped with the apparatus of the present invention.

Still referring to FIG. 2, when the time reset switch 162 is actuated it puts ground 166 on a lead 168, the latter being connected with the time memory flip flop 52 thereby causing the alter to be reset. When the time memory flip flop 52 is reset it produces a pulse over lead 170 which is connected to the speed counter 112 thereby resetting the latter. As shown on FIG. 2, the reset pulse on line 168 is also conducted along a line 172, and it will be understood that the line 172 is connected to the time counter 42 for the purpose of clearing the time counter.

As shown in FIG. 3, the line 172 is further connected with the ready-to-compute and compute flip flops 74 and 86 so that actuation of the time reset switch 162 will reset the latter two flip flops. The line 172 is further connected to the sign bit or sign flip-flop shown at 60 in FIG. 1 so as to lock or reset the latter to a plus condition. When the sign flip-flop 60 is thus reset to a plus, distance information is prevented from entering the distance shift register 56, and thus the continued pulsing of the shift register causes the same to be cleared. However, as previously noted, the time reset switch 162 does not clear the distance counter 10, nor does it reset the distance memory flip flop 34 or the error memory flip flop 138.

When the system reset switch 164 as shown in FIG. 2 is actuated, it generates a time reset signal over the lead 168 and thus accomplishes all of the resetting functions described above with respect to actuation of the time reset switch 162. In addition, a reset signal is conducted over a lead 176 which connects with leads 178 and 180. The lead 178 is connected to the error memory flip flop 138 to reset the latter, and the lead 180 is connected to the distance memory flip flop 34 as shown in FIG. 2 to reset the same. In addition, the lead 180 is further connected to the distance counter 10 of FIG. 1 to clear the latter.

The apparatus of the present invention can easily be calibrated by adjusting the frequency of the clock 40 as shown at 182 in FIG. 1. The clock 40 has been described as producing 170.7 pulses per second, and this is the proper frequency providing the odometer driven distance pulse generating apparatus as shown in FIG. 4 produces exactly 6000 pulses per mile. However, it will be understood that due to various factors such as vehicle tire wear and the like, the apparatus of FIG. 4 may produce somewhat more or less than 6000 pulses per mile.

An operator or driver of a vehicle equipped with the apparatus of the present invention may perform a calibration by measuring on a convenient roadway a selected distance such as one-half of a mile and marking the carefully measured distance by placing two markers on the roadway. The operator then may drive the vehicle over the measured distance, turning on the distance switch 12 when the first marker is reached and turning off the distance switch when the second marker is reached, thereby feeding a known distance such as one-half mile into the distance counter 10. The operator may also feed a known time into the time counter 42 by using a stop watch and carefully turning on the time switch 44 for a selected time such as 30 seconds by use of the stop watch.

Thus, by way of example, if the operator feeds a known distance of one-half mile and a known time of 30 seconds into the device, the speed readout 116 should display a speed of 60.0 miles per hour. If the speed readout were to indicate a greater speed than 60.0 miles per hour under the foregoing conditions, then the frequency of the clock 40 would be adjusted upwardly, and the apparatus rechecked. Similarly, if the speed readout were to indicate a lesser speed than 60.0 miles per hour during the foregoing calibration check, then the frequency of the clock 40 would be adjusted downwardly.

Depending upon the nature of the components used in the apparatus of the present invention, and the temperature conditions to which such apparatus is to be subjected, it may be found desirable to provide a heater element in combination with a thermostat to assure that the device will not be used until the heater has raised the surrounding temperature to a predetermined value. For example, a thermostat may be connected to the speed readout 115 so as to prevent the latter from displaying a speed reading unless the temperature is above a certain value.

While we have described our invention in certain preferred forms, we do not intend to be limited to such forms, except insofar as the appended claims are so limited, since modifications coming within the scope of our invention will readily occur to those skilled in the art, particularly with our disclosure before them.

We claim:

1. Apparatus intended to be mounted in one motor vehicle and operated by a driver thereof for measuring the average speed of another motor vehicle or target vehicle being observed by the driver of the one vehicle, the improvement comprising, in combination, distance pulse generating means connected to the one vehicle for generating a plurality of electrical distance pulses the number of which is proportional to distance travelled by said one vehicle, manually operable distance switch means, time pulse generating means for generating a plurality of electrical time pulses the number of which is proportional to elapsed time, manually operable time switch means, electrical distance counter means for counting said distance pulses, said distance switch means serving to operatively connect said distance counter means with said distance pulse generating means, electrical time counter means for counting said time pulses, said time switch mean serving to operatively connect said time counter means with said time pulse generating means, divide circuit means for in effect dividing the number of distance pulses in said distance counter means by the number of time pulses in said time counter means whereby the resulting quotient will indicate the speed of the target vehicle, and speed readout means for visibly displaying said speed.

2. The invention of claim 1 where said distance pulse generating means is connected mechanically to a mechanical drive component of the one vehicle so as to be driven therefrom an amount proportional to the distance travelled by the one vehicle.

3. The invention of claim 1 including distance register means connected between said distance counter means and said divide circuit means, and means for transferring the distance information in the distance counter means to the distance register means on a non-destruct basis so as to permit repeated use of the same distance information in subsequent speed computations.

4. The invention of claim 1 including compute start means for initiating a speed computation by said divide circuit means, said compute start means being automatically operable in response to four conditions comprising the turning on of said distance switch means, the turning off of said distance switch means, the turning on of said time switch means and the turning off of said time switch means.

5. The invention of claim 4 where said compute start means includes four element "and" gate means having four inputs, a first gate element being enabled when said distance switch is turned on, a second gate element being enabled when said distance switch is turned off, a third gate element being enabled when said time switch is turned on, and a fourth gate element being enabled when said time switch is turned off, said gate means being responsive to the foregoing four enables to produce an output signal which is utilized to initiate a speed computation by said divide circuit means.

6. The invention of claim 1 where said divide circuit means includes subtractor means which repeatedly subtracts the number of said time pulses from the number of said distance pulses, means for stopping the computation process when the number of remaining distance pulses is reduced to zero or becomes negative, and speed counter means for counting the number of successful subtiactions prior to the stopping of the computation process, said speed counter means being connected with said speed readout means.

7. The invention of claim 6 including distance shift register means connected between said distance counter means and said subtractor means, means for transferring the distance information in the distance counter means to said distance shift register means on a non-destruct basis so as to permit repeated use of the same distance information in subsequent speed computations, control counter means pulsed by computer clock means for controlling the feeding of the distance information in said distance shift register means and the time information in said time counter means to said subtractor means imultaneously and in serial fashion, the distance remainder information being fed back to said distance shift register means after each subtraction.

8. The invention of claim 7 where binary multiplier means is added to the least significant side of said distance shift register means, and sign-sensing means is added to the most significant side of said distance shift register means, said sign-sensing means being utilized to stop the computation process when the distance remainder in the distance shift register means goes through zero and becomes negative.

9. The invention of claim 6 where said speed counter means comprises a binary coded decimal counter, means for transmitting one pulse to said speed counter means each time a successful subtraction is performed, and lamp segment decoder/driver means connected with said speed counter means, said speed readout means comprising a lamp segment display connected with said lamp segment decoder means for displaying a lighted digital speed reading corresponding to the number of pulses transmitted to said speed counter means.

10. The invention of claim 1 including reset means selectively operable to reset the entire apparatus or to reset all of the time components and readout means without resetting the distance counter means.

11. The invenion of claim 1 where said time pulse generating means comprises oscillator means which produces a predetermined number of electrical time pulses per second, said oscillator means being connected to said time counter means by said manually operable time switch means whereby said time counter means will count said time pulses only when said time switch means is turned on.

12. The invention of claim 1 where said distance counter means and said time counter means each comprises a binary counter.

13. The invention of claim 1 including means responsive to overflow pulses from said distance counter means or said time counter means to indicate to an operator that the capacity thereof has been exceeded.

14. The invention of claim 1 including computer clock means and control counter means for controlling the feeding of the distance information in the distance counter and the time information in the time counter to said divide circuit means, said time and distance information being fed to said divide circuit means simultaneously in serial fashion.

15. The invention of claim 1 where said distance pulse generating means comprises a light source in combination with photo-sensitive means, and rotatable light interrupting means interposed between said light source and said photo-sensitive means, said interrupting means having a plurality of circumferentially spaced openings which permit light from said light source to strike said photo-sensitive means a predetermined number of times for each revolution of said interrupting means, and means connecting said interrupting means with a mechanical drive component of said one vehicle whereby said interrupting means will be driven from said drive component an amount proportional to the distance travelled by said one vehicle.

16. The invention of claim 1 where said time pulse generating means is manually adjustable to permit variation of the frequency thereof for calibration purposes.

17. The invention of claim 14 where said interrupting means is connected to the odometer cable of said one vehicle so as to be rotated thereby.

18. The invention of claim 1 including error indicating means for indicating to an operator that an error has been made in the manual operation of the apparatus, said error indicating means being responsive to any of the following conditions comprising turning on the distance switch for a distance in excess of the capacity of the distance counter, turning on the time switch for a time in excess of the capacity of the time counter, turning on the distance switch a second time without clearing the distance counter of information previously stored therein, and turning on the time switch a second time without clearing the time counter of information previously stored therein.

19. Apparatus intended to be mounted in one motor vehicle and operated by a driver thereof for measuring the average speed of another motor vehicle or target vehicle being observed by the driver of the one vehicle, the improvement comprising, in combination, distance pulse generating means connected to the one vehicle for generating a plurality of electrical distance pulses the number of which is proportional to distance travelled by said one vehicle, said distance pulse generating means being connected mechanically to a mechanical drive component of the one vehicle so as to be driven therefrom an amount proportional to the distance travelled by the one vehicle, manually operable distance switch means, time pulse generating means for generating a plurality of electrical time pulses the number of which is proportional to elapsed time, manually operable time switch means, electrical distance counter means for counting said distance pulses, said distance switch means serving to operatively connect said distance counter means with said distance pulse generating means, electrical time counter means for counting said time pulses, said time switch means serving to operatively connect said time counter means with said time pulse generating means, divide circuit means for in effect dividing the number of distance pulses in said distance counter means by the number of time pulses in said time counter means whereby the resulting quotient will indicate the speed of the target vehicle, distance register means connected between said distance counter means and said divide circuit means, means for transferring the distance information in the distance counter means to the distance register means on a non-destruct basis so as to permit repeated use of the same distance information in subsequent speed computations, compute start means for initiating a speed computation by said divide circuit means, said compute start means being automatically operable in response to four conditions comprising the turning on of said distance switch means, the turning off of said distance switch means, the turning on of said time switch means and the turning off of said time switch means, and speed readout means for visibly displaying the speed as determined by said divide circuit means.

20. The invention of claim 19 where said divide circuit means includes subtractor means which repeatedly subtracts the number of said time pulses from the number of said distance pulses, means for stopping the computation process when the number of remaining distance pulses is reduced to zero or becomes negative, and speed counter means for counting the number of successful subtractions prior to the stopping of the computation process, said speed counter means being connected with said speed readout means.

21. Apparatus intended to be mounted in one motor vehicle and operated by a driver thereof for measuring the average speed of another motor vehicle or target vehicle being observed by the driver of the one vehicle, the improvement comprising, in combination, distance pulse generating means connected to the one vehicle for generating a plurality of electrical distance pulses the number of which is proportional to distance travelled by said one vehicle, said distance pulse generating means being connected mechanically to a mechanical drive component of the one vehicle so as to be driven therefrom an amount proportional to the distance travelled by the one vehicle, manually operable distance switch means, time pulse generating means comprising oscillator means which produces a predetermined number of electrical time pulses per second, manually operable time switch means, binary distance counter means for counting said distance pulses, said distance switch means serving to operatively connect said binary distance counter means with said distance pulse generating means, binary time counter means for counting said time pulses, said oscillator means being connected to said time counter means by said manually operable time switch means whereby said binary time counter means will count said time pulses only when said time switch means is turned on, divide circuit means for dividing the number of distance pulses in said binary distance counter means by the number of time pulses in said binary time counter means whereby the resulting quotient will indicate the speed of the target vehicle, said divide circuit means including subtractor means which repeatedly subtracts the number of said time pulses from the number of said distance pulses, means for stopping the computation process when the number of remaining distance pulses is reduced to zero or becomes negative, speed counter means for counting the number of successful subtractions prior to the stopping of the computation process, speed readout means connected to said speed counter means, distance register means connected between said binary distance counter means and said divide circuit means, means for transferring the distance information in the binary distance counter means to the distance register means on a non-destruct basis so as to permit repeated use of the same distance information in subsequent speed computations, compute start means for initiating a speed computation by said divide circuit means, said compute start means being automatically operable in response to four conditions comprising the turning off of said distance switch means, the turning off of said distance switch means, the turning on of said time switch means and the turning off of said time switch means, reset means selectively operable to reset the entire apparatus or to reset all of the time components and readout means without resetting the binary distance counter means, and computer clock means and control counter means for controlling the feeding of the distance information in the distance register means and the time information in the binary time counter means to said divide circuit means.

References Cited

UNITED STATES PATENTS

| | | | |
|---|---|---|---|
| 3,182,331 | 5/1965 | Marshall | 324—70 X |
| 3,276,029 | 9/1966 | Marshall | 346—18 |
| 3,441,207 | 4/1969 | Marshall | 346—18 X |

MICHAEL J. LYNCH, Primary Examiner

U.S. Cl. X.R.

235—92, 151.32; 346—18